(12) United States Patent
Gao et al.

(10) Patent No.: US 9,811,710 B2
(45) Date of Patent: Nov. 7, 2017

(54) FINGERPRINT IDENTIFYING DEVICE AND FINGERPRINT IDENTIFYING SYSTEM

(71) Applicants: BOE Technology Group Co., Ltd., Beijing (CN); Beijing BOE Optoelectronics Technology Co., Ltd., Beijing (CN)

(72) Inventors: Jian Gao, Beijing (CN); Yingming Liu, Beijing (CN); Xiaochen Niu, Beijing (CN); Xiaochuan Chen, Beijing (CN); Haisheng Wang, Beijing (CN); Qian Wang, Beijing (CN); Ming Yang, Beijing (CN); Pengcheng Lu, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 15/116,172

(22) PCT Filed: Jan. 21, 2016

(86) PCT No.: PCT/CN2016/071620
§ 371 (c)(1),
(2) Date: Aug. 2, 2016

(87) PCT Pub. No.: WO2017/036072
PCT Pub. Date: Mar. 9, 2017

(65) Prior Publication Data
US 2017/0262686 A1    Sep. 14, 2017

(30) Foreign Application Priority Data
Aug. 28, 2015    (CN) .......................... 2015 1 0543546

(51) Int. Cl.
*G06K 9/00*    (2006.01)

(52) U.S. Cl.
CPC ....... *G06K 9/0004* (2013.01); *G06K 9/00053* (2013.01)

(58) Field of Classification Search
CPC .... G06K 9/0004; G06K 9/00046; G06K 9/00; H01L 27/14678; H01L 27/14601
(Continued)

(56) References Cited

U.S. PATENT DOCUMENTS

2008/0273771 A1* 11/2008 Hsieh ................ G06K 9/00046
382/127

FOREIGN PATENT DOCUMENTS

CN    101814126 A    8/2010
CN    103810483 A    5/2014
(Continued)

OTHER PUBLICATIONS

Mar. 25, 2016—International Search Report and Written Opinion Appn PCT/CN2015/071620 with Eng Tran.

*Primary Examiner* — Manuchehr Rahmjoo
(74) *Attorney, Agent, or Firm* — Banner & Witcoff, Ltd.

(57) ABSTRACT

A fingerprint identifying device and a fingerprint identifying system are provided. The fingerprint identifying device including: a substrate; a transparent cover plate, located right above the substrate; a detection light source, located on a first side of the transparent cover plate; and a photoelectric sensor, located on a side of a lower surface of the transparent cover plate, wherein, a refractive index of the transparent cover plate is less than a refractive index of a skin of a human fingerprint part, the transparent cover plate has a side surface on the first side, and an angle between the side surface and an upper surface of the transparent cover plate is an acute angle, the detection light source is configured to provide a light beam towards the side surface of the transparent cover plate, so that the light beam is incident to the
(Continued)

upper surface of the transparent cover plate through the side surface of the transparent cover plate, and the light beam is totally reflected on the upper surface of the transparent cover plate in a case that the upper surface of the transparent cover plate is in contact with air, the photoelectric sensor is configured to receive a light beam reflected from the upper surface of the transparent cover plate. The fingerprint identifying device is capable of improving the identifying accuracy thereof.

20 Claims, 6 Drawing Sheets

(58) Field of Classification Search
USPC .......................................................... 382/124
See application file for complete search history.

(56) References Cited

FOREIGN PATENT DOCUMENTS

| | | |
|---|---|---|
| CN | 105184248 A | 12/2015 |
| CN | 105184282 A | 12/2015 |

* cited by examiner

FINGERPRINT IDENTIFYING DEVICE AND FINGERPRINT IDENTIFYING SYSTEM

The application is a U.S. National Phase Entry of International Application No. PCT/CN2016/071620 filed on Jan. 21, 2016, designating the United States of America and claiming priority to Chinese Patent Application No. 201510543546.6 filed on Aug. 28, 2015. The present application claims priority to and the benefit of the above-identified applications and the above-identified applications are incorporated by reference herein in their entirety.

TECHNICAL FIELD

Embodiments of the present disclosure relate to a fingerprint identifying device and a fingerprint identifying system.

BACKGROUND

With development of a fingerprint identifying technology, it is widely applied to a lot of fields, for example, a mobile phone, a tablet personal computer, a television in electronic device terminals; an access control system and a safe box in a security protection system. Implementation modes of collecting a fingerprint in the fingerprint identifying technology mainly include an optical mode, a capacitive mode, and an ultrasound imaging mode and so on, wherein a fingerprint identifying technology implemented by collecting the fingerprint in the optical mode has a relatively large identifying range, and a relatively low cost.

SUMMARY

An embodiment of the present disclosure provides a fingerprint identifying device, comprising: a substrate; a transparent cover plate, located right above the substrate; a detection light source, located on a first side of the transparent cover plate; and a photoelectric sensor, located on a side of a lower surface of the transparent cover plate, wherein, a refractive index of the transparent cover plate is less than a refractive index of a skin of a human fingerprint part, the transparent cover plate has a side surface on the first side, and an angle α between the side surface and an upper surface of the transparent cover plate is an acute angle, the detection light source is configured to provide a light beam towards the side surface of the transparent cover plate, so that the light beam is incident to the upper surface of the transparent cover plate through the side surface of the transparent cover plate, and the light beam is totally reflected on the upper surface of the transparent cover plate in a case that the upper surface of the transparent cover plate is in contact with air, the photoelectric sensor is configured to receive a light beam reflected from the upper surface of the transparent cover plate.

Another embodiment of the present disclosure provides a fingerprint identifying system including a fingerprint identifying device described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 5b is a structural schematic diagram of a fingerprint identifying device provided by an embodiment of the present disclosure, wherein a photoelectric sensor is arranged on a counter substrate in;

FIG. 5c is a structural schematic diagram of a fingerprint identifying device provided by an embodiment of the present disclosure, wherein a photoelectric sensor is arranged between a transparent cover plate and a counter substrate in.

DETAILED DESCRIPTION

Figure 1:
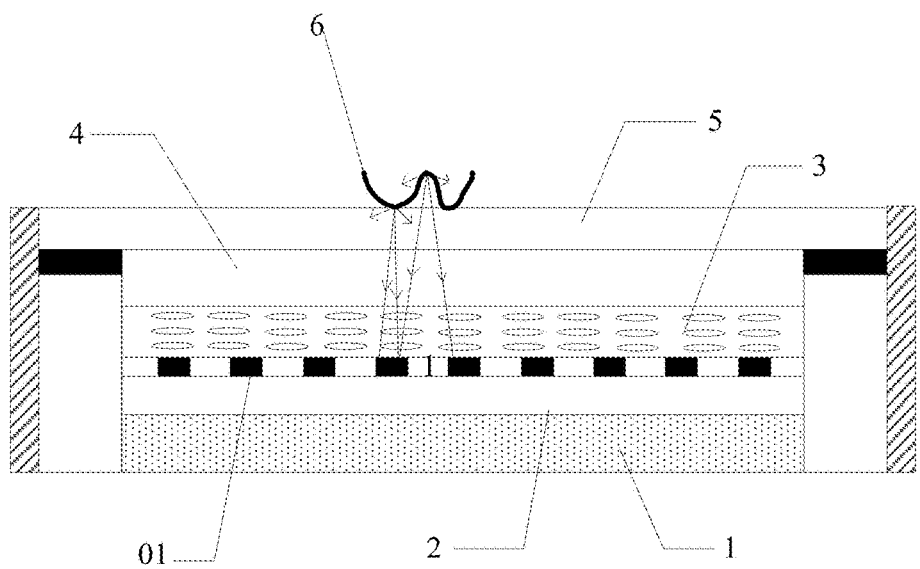
FIG. 1 is a structural schematic diagram of a liquid crystal display device having a fingerprint identifying function in a related art.

In a related art, an optical fingerprint identifying technology applied to a liquid crystal display device such as a mobile phone and other mobile terminals is not yet mature. As shown in FIG. 1, a liquid crystal display device having a fingerprint identifying function usually includes a backlight 1, an array substrate 2, a liquid crystal layer 3, a counter substrate 4, and a glass cover plate 5; a photoelectric sensor 01 is usually arranged on the array substrate 2; the backlight 1 is used as a detection light source, when a finger 6 touches the glass cover plate 5, light of the backlight 1 is diffusely reflected in a position touched by the finger 6 after sequentially passing the array substrate 2, the liquid crystal layer 3, the counter substrate 4 and the glass cover plate 5, and then the light arrives at the photoelectric sensor 01 after sequentially passing the glass cover plate 5, the counter substrate 4 and the liquid crystal layer 3, so that positions of a wave trough (referred as a trough hereinafter) and a wave peak (referred as a peak hereinafter) of a fingerprint part of the finger 6 may be determined by detecting a strength of a signal of the photoelectric sensor 01, to identify a fingerprint. However, since a transmittance of the liquid crystal layer 3 is relatively low, when the light of the backlight 1 in the liquid crystal display device described above arrives at the photoelectric sensor 01 after passing the liquid crystal layer 3 twice, a light energy thereof is very low, and because the light is diffusely reflected from the finger 6 to the photoelectric sensor 01, and a energy difference between the divergent light diffusely reflected from the trough and the peak of the fingerprint part of the finger 6 is slight, and meanwhile, there is interference of ambient light between the trough and the peak of the fingerprint part of the finger, so that the liquid crystal display device described above is difficult to identify the fingerprint correctly.

In view of this, embodiments of the present disclosure provide a fingerprint identifying device and a fingerprint identifying system, capable of making a greater difference in light intensities between light reflected from the trough of the fingerprint part and light reflected from the peak of the fingerprint part to be received by the photoelectric sensor, so as to improve an accuracy rate of the fingerprint identifying system.

The technical solutions of the fingerprint identifying device and the fingerprint identifying system provided by the embodiments of the present disclosure will be described in a clearly and fully understandable way in connection with the accompanying drawings, and it is obvious that the described embodiments are just a part but not all of the embodiments of the present disclosure. Based on the described embodiments of the present disclosure, those ordinarily skilled in the art can obtain other embodiment(s), without any inventive work, which should be within the protective scope of the present disclosure.

Shapes and sizes of respective parts in the drawings do not reflect real proportions of the fingerprint identifying panel and the fingerprint identifying device, and only aim to illustrate a content of the present disclosure.

An embodiment of the present disclosure provides a fingerprint identifying device, as shown in FIG. 2a to FIG. 2d, comprising a substrate 10, a transparent cover plate 11 located right above the substrate 10, a detection light source 12 and a plurality of photoelectric sensors 01; wherein, A refractive index of the transparent cover plate 11 is less than a refractive index of a skin of a human fingerprint part, a side surface of the transparent cover plate 11 facing the detection light source 12 is an inclined surface, and an angle $\alpha$ between the inclined surface and an upper surface of the transparent cover plate 11 is an acute angle;

The detection light source 12 is located on a side of the inclined surface of the transparent cover plate 11, and light emitted by the detection light source 12 enters into the transparent cover plate 11 from the inclined surface of the transparent cover plate 11, and light is totally reflected on an upper surface of the transparent cover plate 11 when the upper surface of the transparent cover plate 11 is in contact with air;

When a finger 15 touches the upper surface of the transparent cover plate 11, part of light is reflected by the finger 15 to the photoelectric sensor 01;

The photoelectric sensor 01 is located on a side of a lower surface of the transparent cover plate 11, and the photoelectric sensor 01 is configured for receiving light reflected from the upper surface of the transparent cover plate 11.

Figure 3:
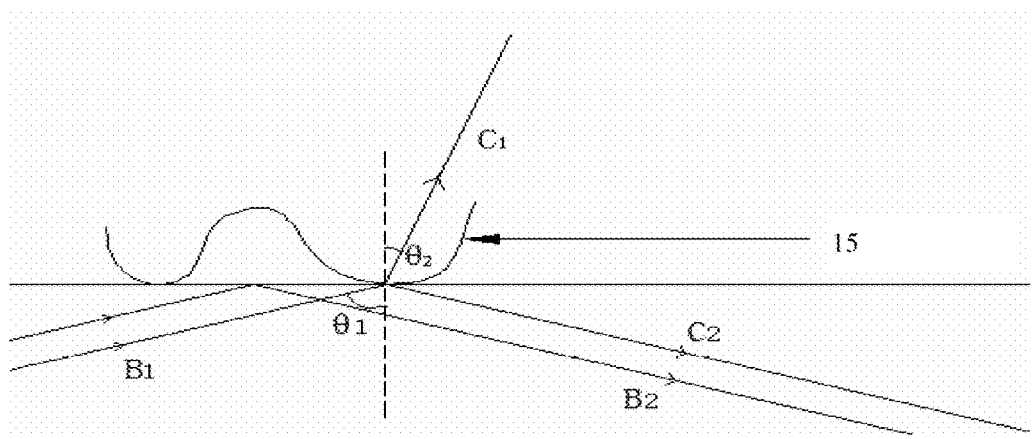
FIG. 3 is a schematic diagram of light propagation at positions of a trough and peak of a fingerprint part when the finger touch occurs in an embodiment of the present disclosure.

In the fingerprint identifying device provided by the embodiment of the present disclosure, a side surface of the transparent cover plate is set to be an inclined surface, so that an angle between the inclined surface and the upper surface of the transparent cover plate is an acute angle, and a detection light source is arranged on a side of the inclined surface of the transparent cover plate. When the finger 15 does not touch, because a refractive index of the transparent cover plate is greater than a refractive index of air, it is only necessary to ensure that an incident angle of light incident onto the upper surface of the transparent cover plate 11 after passing through the inclined surface is greater than a critical angle of total reflection for light traveling from the transparent cover plate to the air, so as to ensure that light enters into the transparent cover plate through the inclined surface of the transparent cover plate is totally reflected on the upper surface of the transparent cover plate. The photoelectric sensor is arranged in a position where light reflected from the upper surface of the transparent cover plate can be received, so that intensity of light received by the photoelectric sensor can be detected by the photoelectric sensor. As shown in FIG. 3, when the finger 15 touches the upper surface of the transparent cover plate 11, the trough of the fingerprint part is not in contact with the transparent cover plate 11, so that light B1 at a position of the trough may be totally reflected to only generate a reflected light B2, and light energy is totally reflected back, while the peak of the fingerprint part is in contact with the transparent cover plate 11, since a refractive index of the transparent cover plate 11 is less than a refractive index of a skin of a human fingerprint part, a part of light B1 at a position of the peak is refracted to form a refracted light C1 to be incident into air, and a part of the light is reflected to form a reflected light C2 to irradiate onto the photoelectric sensor 01, resulting in a greater difference in light intensities between light reflected from the position of the trough and light reflected from the position of the peak, thereby improving an accuracy rate of the fingerprint identifying device.

In addition, in the fingerprint identifying device described above, because light from the detection light source does not need to pass the liquid crystal layer for many times, a larger intensity of light reflected to the photoelectric sensor can be ensured, so as to further improve the accuracy rate of the fingerprint identifying device.

In implementation, in the fingerprint identifying device provided by the embodiment of the present disclosure, light emitted by the detection light source is controlled to be, for example, a parallel light, and an incident angle $\beta$ of the parallel light incident to the transparent cover plate satisfies equations as follows: $\beta=90°-\alpha$, or $\beta=0°$.

Figure 2A:
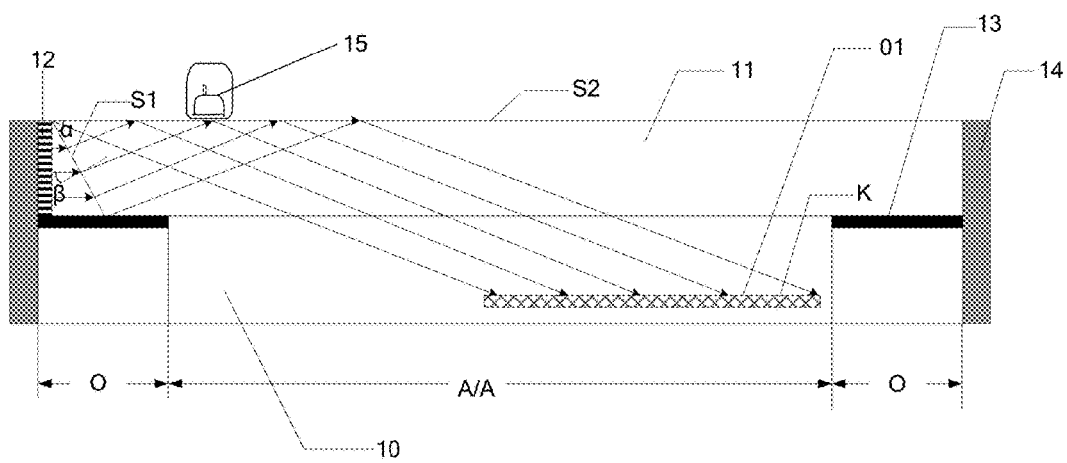
FIG. 2a to FIG. 2d are structural schematic diagrams of a fingerprint identifying device provided by an embodiment of the present disclosure.
Figure 2B:
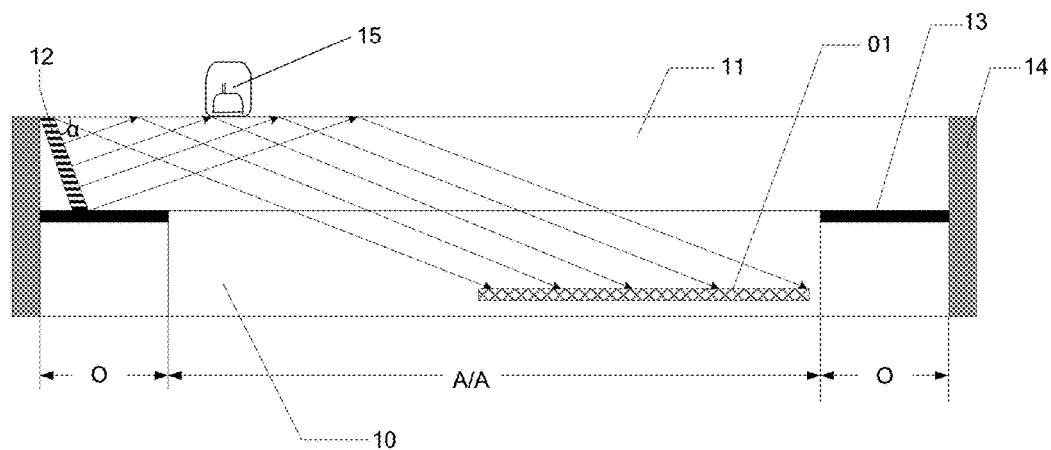
Figure 2C:
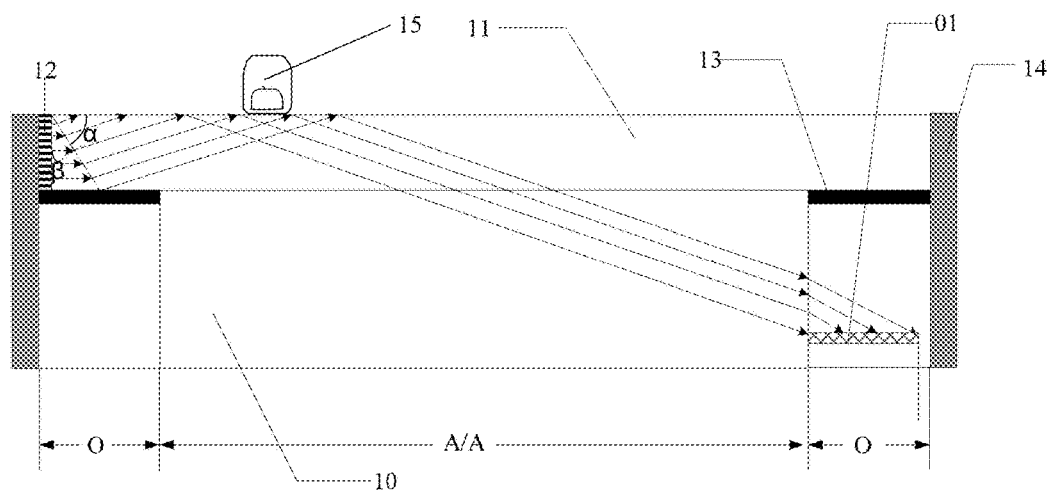

For example, in the fingerprint identifying device provided by the embodiment of the present disclosure, when the incident angle of the parallel light emitted by the detection light source incident to the transparent cover plate 11 is $\beta=90°-\alpha$, as shown in FIG. 2a and FIG. 2c, the detection light source 12 is arranged to be perpendicular to an upper surface of the transparent cover plate 11, and a traveling direction of the parallel light emitted by the detection light source 12 is parallel to the upper surface of the transparent cover plate 11. The structure is easy to assemble, but part of light is reflected when the parallel light emitted by the detection light source 12 is incident to the transparent cover plate 11, so that part of light energy may be lost.

Figure 2D:
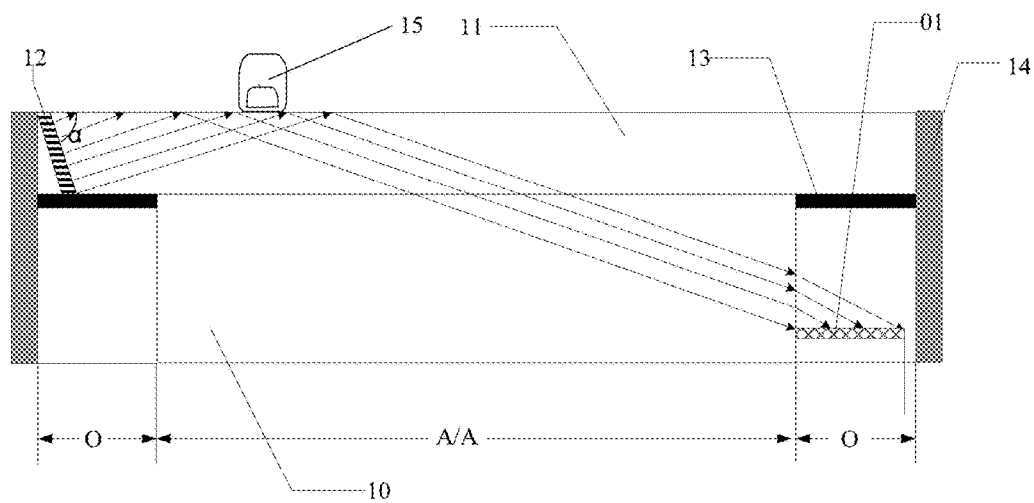

For example, as shown in FIG. 2b and FIG. 2d that, in the fingerprint identifying device provided by the embodiment of the present disclosure, in a case where the incident angle of the parallel light emitted by the detection light source incident to the transparent cover plate 11 is $\beta=0°$, that is, the parallel light emitted by the detection light source 12 is vertically incident to the inclined surface of the transparent cover plate (for example, the detection light source 12 is pasted on an inclined surface S1 of the transparent cover plate 11), the parallel light emitted by the detection light source 12 is vertically incident to the inclined surface S of the transparent cover plate 11, so that an energy of light almost does not have reflective loss on the inclined surface S, thereby increasing an intensity of light incident to the transparent cover plate 11, further improving the accuracy rate of identifying a fingerprint. However, the structure has a certain difficulty in technology, and has high requirement on the light source, which is generally implemented by a flexible light source of high cost.

Further, in the fingerprint identifying device provided by the embodiment of the present disclosure, the transparent cover plate 11 adopts a glass cover plate. The reasons are: Firstly, the transparent cover plates of most of current display devices are glass cover plates; and secondly, a refractive index of the glass cover plate is close to refractive indexes of respective film layers in a display panel, so that energy loss may be reduced.

Further, for example, in the fingerprint identifying device provided by the embodiment of the present disclosure, the substrate 10 is a display panel, and the display panel, for example, may be a liquid crystal display panel, or may be an organic electroluminescent display panel, which is not limited here.

For example, in the fingerprint identifying device provided by the embodiment of the present disclosure, the display panel has a display region and a peripheral region; by selecting a suitable angle α, the photoelectric sensor can be arranged in the display region, or can be arranged in the peripheral region, and of course, may be partially arranged in the display region and partially arranged in the peripheral region, which is not limited here.

For example, in order to prevent an accuracy rate of identifying a fingerprint from being affected by an energy difference between light received by the detecting region in the display region and light received by the detecting region in the peripheral region, the photoelectric sensor is totally arranged in the display region, or totally arranged in the peripheral region.

Figure 4A:
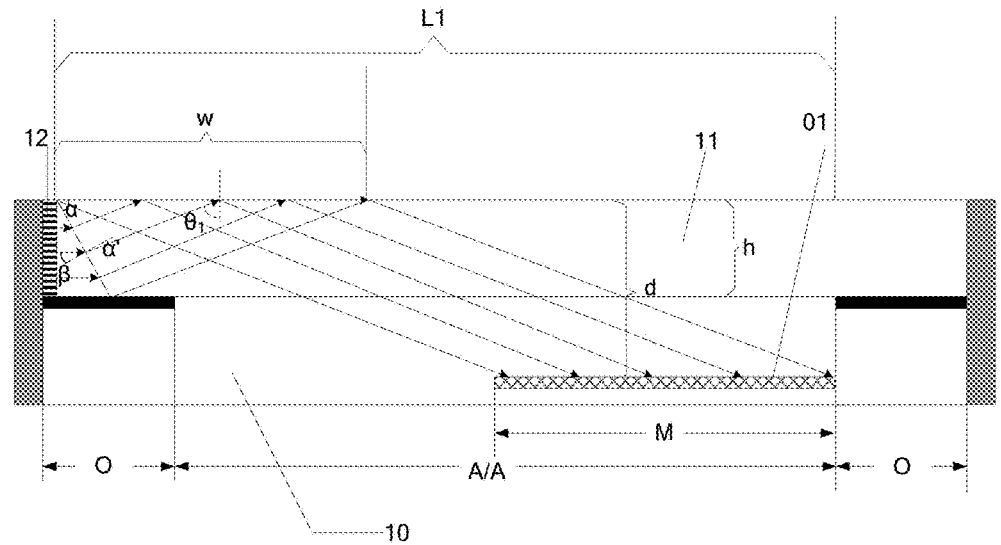
FIG. 4a is a position schematic diagram of an angle α and a touch region in a fingerprint identifying device provided by Embodiment I of the present disclosure.
Figure 4B:
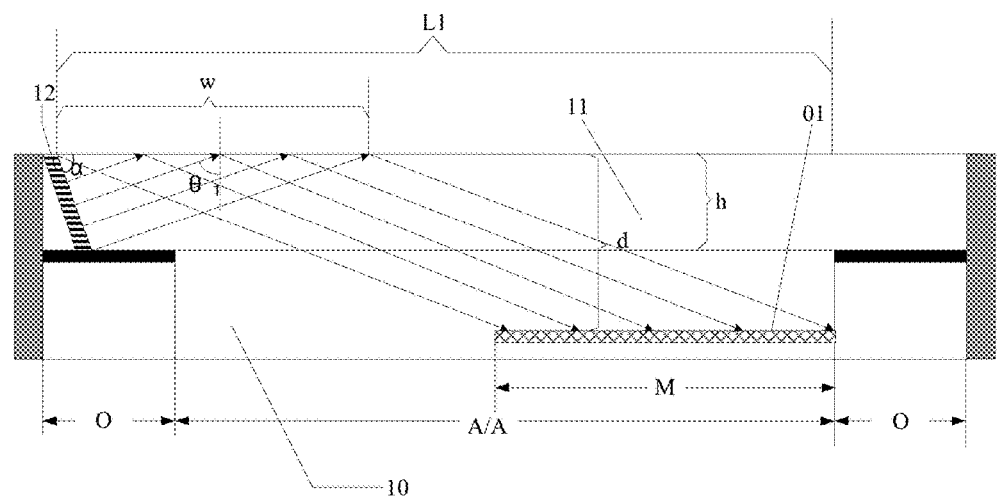
FIG. 4b is a position schematic diagram of an angle α and a touch region in a fingerprint identifying device provided by Embodiment II of the present disclosure.

For example, in the fingerprint identifying device provided by the embodiment of the present disclosure, as shown in FIG. 4a and FIG. 4b, the display panel has a display region A/A and a peripheral region O; wherein, When the photoelectric sensor 01 is located in the display region A/A, a range of an angle α between an inclined surface S1 and an upper surface S2 of the transparent cover plate 11 may be designed according to a refractive index of the transparent cover plate 11, an incident angle β, a thickness of the transparent cover plate 11, thicknesses and refractive indexes of respective film layers between the photoelectric sensor 01 and the transparent cover plate 11, and a width from an edge on the side of the inclined surface of the upper surface of the transparent cover plate 11 to a vertical projection of an interface between the display region A/A and the peripheral region O on an upper surface of the transparent cover plate 11, on the opposite side.

Hereinafter, it is described by taking an example that refractive indexes of respective film layers between the transparent cover plate and the photoelectric sensor are the same as a refractive index of the transparent cover plate.

For example, in the fingerprint identifying device provided by the embodiment of the present disclosure, when a plurality of photoelectric sensors are located in the display region A/A, the angle α is determined by a formula as follows:

$h \cdot \tan \theta_1 + h/\tan \alpha + d \cdot \tan \theta_1 < L1$ where, if $\beta = 90° - \alpha$, $\theta_1 = \arcsin(\sin \beta \cdot n_0/n_1)$; and if $\beta = 0°$, $\theta_1 = \alpha$;

n1 denotes a refractive index of the transparent cover plate, h denotes a thickness of the transparent cover plate; d denotes a distance from a light receiving surface K of the photoelectric sensor 01 to an upper surface S2 of the transparent cover plate 11; L1 denotes a width from an edge on the side of the inclined surface of the upper surface S2 of the transparent cover plate 11 to a vertical projection of an interface between the display region A/A and the peripheral region O on an upper surface of the transparent cover plate 11, on the opposite side; $n_0$ denotes a refractive index of a medium at a position of the detection light source 12 (i.e., a refractive index of a medium adjoining to the inclined surface on the side of the inclined surface), and $\theta_1$ denotes an incident angle of light incident onto the upper surface S2 of the transparent cover plate 11 after entering the transparent cover plate 11. For example, the light receiving surface K of the photoelectric sensor 01 and the upper surface S2 of the transparent cover plate 11 are parallel to each other.

Hereinafter, the fingerprint identifying device provided by the embodiment of the present disclosure is described by two embodiments.

Embodiment I

When the incident angle β is equal to 90°−α, as shown in FIG. 4a, the angle α between the inclined surface of the transparent cover plate 11 and the upper surface of the transparent cover plate 11, and a detecting region M where the plurality of photoelectric sensors 01 are located satisfies formulas as follows:

$$\beta = 90° - \alpha \quad (1)$$

$$\sin \beta \cdot n_0 = \sin \alpha' \cdot n_1 \quad (2)$$

$$\theta_1 = \alpha' + \alpha \quad (3)$$

$$w = h \cdot \tan \theta_1 + h/\tan \alpha \quad (4)$$

$$w + d \cdot \tan \theta_1 < L1 \quad (5)$$

Where, α' denotes a refractive angle of the parallel light entering into the transparent cover plate 11; w denotes a width of a covering region of the upper surface of the transparent cover plate 11 which is irradiated by the parallel light after entering into the transparent cover plate 11.

It can be seen from FIG. 4a that, as long as it is satisfied that the parallel light beam emitted by the detection light source 12 does not exceed an edge of the display region A/A when being reflected from the upper surface S2 of the transparent cover plate 11 to a level where the photoelectric sensor 01 is located, that is, the above formula (5) is satisfied, a value range of the angle α between the inclined surface S1 of the transparent cover plate 11 and the upper surface S2 of the transparent cover plate 11 when the photoelectric sensors 01 are located in the display region A/A may be determined according to the formulas (1) to (5) described above.

Embodiment II

When the incident angle β is equal to 0°, as shown in FIG. 4b, the angle α between the inclined surface of the transparent cover plate 11 and the upper surface of the transparent cover plate 11, and a detecting region M where a plurality of photoelectric sensors 01 are located satisfies formulas as follows:

$$\theta_1 = \alpha \quad (6)$$

$$w = h \cdot \tan \theta_1 + h/\tan \alpha \quad (4)$$

$$w + d \cdot \tan \theta_1 < L1 \quad (5)$$

It can be seen from FIG. 4b that, as long as it is satisfied that the parallel light beam emitted by the detection light source 12 does not exceed an edge of the display region A/A when being reflected from the upper surface S2 of the transparent cover plate 11 to a layer where the photoelectric sensor 01 is located, that is, the above formula (5) is satisfied, a value range of the angle α between the inclined surface S1 of the transparent cover plate 11 and the upper surface S2 of the transparent cover plate 11 when the photoelectric sensors 01 is located in the display region A/A may be determined according to the formulas (4) to (6) described above.

Furthermore, in the fingerprint identifying device provided by the embodiment of the present disclosure, the angle α between the inclined surface S1 of the transparent cover plate 11 and the upper surface S2 of the transparent cover plate 11 is further determined by a width $w_1$ of a touch region; where, $$w_1 = h \cdot \tan\theta_1 + h/\tan\alpha$$

Furthermore, in the fingerprint identifying device provided by the embodiment of the present disclosure, the angle α between the inclined surface S1 of the transparent cover plate 11 and the upper surface S2 of the transparent cover plate 11 is further determined by a reflectivity ρ of light partially reflected at a position of the transparent cover plate in contact with a finger when the finger touches the transparent cover plate; where, $$\rho = \frac{1}{2}\left[\frac{\sin^2(\theta_1 - \theta_2)}{\sin^2(\theta_1 + \theta_2)} + \frac{\tan^2(\theta_1 - \theta_2)}{\tan^2(\theta_1 + \theta_2)}\right]$$

$$\theta_2 = \arcsin(n_1 \cdot \sin\theta_1 / n')$$

n' denotes a refractive index of a skin of a human fingerprint part, and $\theta_2$ denotes a refracted angle of the light refracted at a position of the transparent cover plate in contact with a finger when the finger touches the transparent cover plate.

For example, the refractive index of the skin of the human fingerprint part is n=1.55, which is greater than the refractive index n1 of the transparent cover plate 11, and as shown in FIG. 3, when transmitting from the transparent cover plate 11 to the peak of the fingerprint part, that is, transmitting from an optically thinner medium to an optically denser medium, light B1 is reflected and refracted at the position of the peak, where, a refractive angle of a refracted light C1 is marked as $\theta_2$, and a reflective angle of a reflected light C2 is marked as $\theta_1$; and when transmitting from the transparent cover plate 11 to the trough of the fingerprint part f, that is, transmitting from an optically denser medium to an optically thinner medium, light B1 is totally reflected to only form a reflected light B2. Since the reflected light B2 at the position of the trough of the fingerprint part is totally reflected, a reflectivity is 100%, while the reflectivity of the reflected light C2 at the position of the peak of the fingerprint is less than 100%.

Hereinafter, it takes a mobile phone with a 5-inch display region of a screen as an example. A thickness h of the transparent cover plate, for example, is 0.55 mm, a distance d from the photoelectric sensor to an upper surface of the transparent cover plate is 0.953 mm, and a width from the side of the inclined surface to an edge of the display region A, on an opposite side, of the upper surface of the transparent cover plate 11 in is L1=110+15=125 mm; and in Embodiment I, the medium at the position of the detection light source 12 is air with a refractive index $n_0$ of 1. The widths $w_1$ of the finger touch regions and the reflectivities ρ of partially reflected light corresponding to different angles α may be obtained by the above formulas. For example, as shown in Table 1 and Table 2:

TABLE 1

| α | $w_1$ | ρ |
|---|---|---|
| 87.9° | 44.08 mm | 78.6% |
| 85.4° | 20.13 mm | 59.1% |
| 80.8 | 10.09 mm | 35% |

TABLE 2

| α | $w_1$ | ρ |
|---|---|---|
| 89.3° | 45.02 mm | 79% |
| 88.4° | 19.71 mm | 58.4% |
| 86.9 | 10.19 mm | 35.6% |

Where, Table 1 shows the widths $w_1$ of the finger touch regions and the reflectivities ρ of the partially reflected light corresponding to different angles α, in a case of β=90°−α; and Table 2 shows the widths $w_1$ of the finger touch regions and the reflectivities ρ of the partially reflected light corresponding to different angles α, in a case of β=0°.

It can be seen from Table 1 and Table 2 that, when a value of the angle α is larger, the width $w_1$ of the finger touch region is also larger, but the reflectivity ρ of the partially reflected light is also larger. A too large reflectivity ρ may result in a slight difference between light reflected from the peak and light reflected from the trough of the fingerprint part, which is not conducive to improving an accuracy rate of identifying a fingerprint. When the value of the angle α is smaller, the reflectivity ρ of the partially reflected light is also smaller, which is conducive to improving the accuracy rate of identifying the fingerprint, but the width $w_1$ of the finger touch region is also smaller. Therefore, in the fingerprint identifying device provided by the embodiment of the present disclosure, the size of the finger touch region can be adjusted according to the angle α, and meanwhile, in reverse, a suitable angle α can be designed according to the size of the finger touch region actually required and an accuracy rate of identifying a fingerprint required.

It can be seen from Embodiment I and Embodiment II that, when the detecting region is arranged in the display region, the width $w_1$ of the finger touch region is relatively large, and the width of the detecting region is also relatively large. However, there may be influence of ambient light.

Figure 5A:
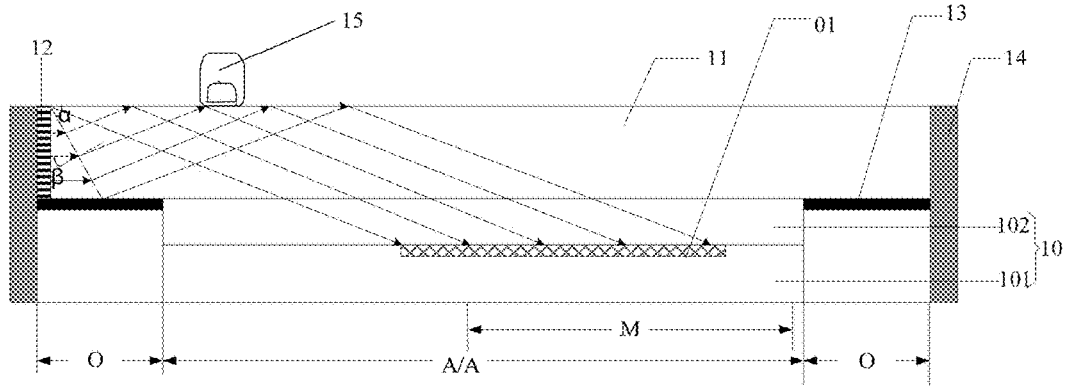
FIG. 5a is a structural schematic diagram of a fingerprint identifying device provided by an embodiment of the present disclosure, wherein a photoelectric sensor is arranged on an array substrate.
Figure 5B:
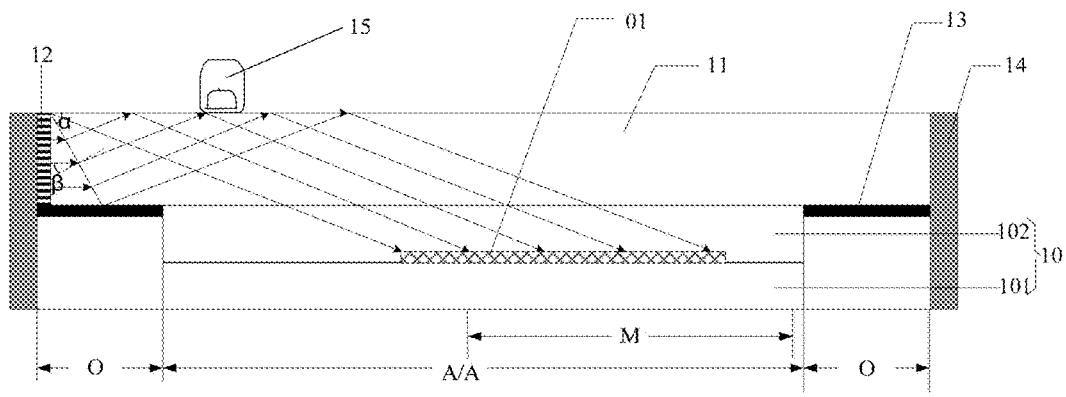
Figure 5C:
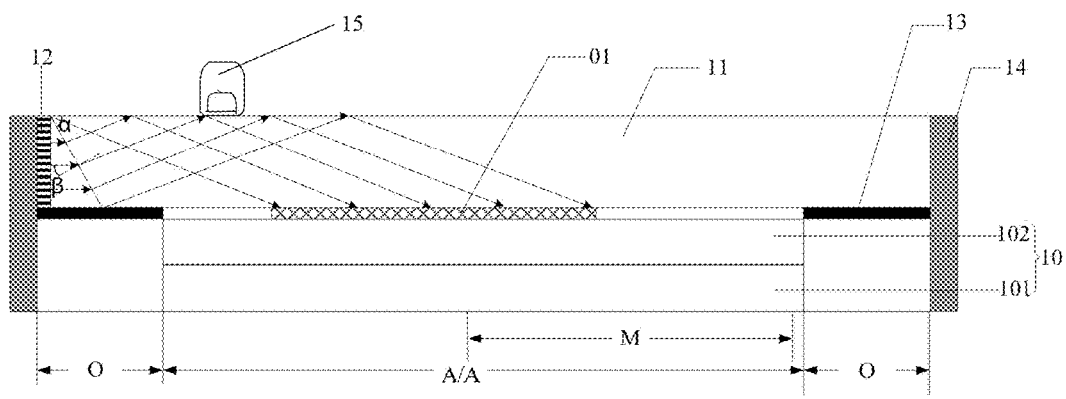

Furthermore, in the fingerprint identifying device provided by the embodiment of the present disclosure, when a plurality of photoelectric sensors 01 are located in the display region A/A, as shown from FIG. 5a to FIG. 5c, the display panel has an array substrate 101 and a counter substrate 102 which are arranged opposite to each other in the display region A/A; wherein, the counter substrate 102 is located between the transparent cover plate 11 and the array substrate 101;

As shown in FIG. 5a, the photoelectric sensor 01, for example, is located on a side of the array substrate 101 facing the counter substrate 102; or As shown in FIG. 5b, the photoelectric sensor 01, for example, is located on a side of the counter substrate 102 facing the array substrate 101; or As shown in FIG. 5c, the photoelectric sensor 01, for example, is located between the transparent cover plate 11 and the counter substrate 102.

For example, in the fingerprint identifying device provided by the embodiment of the present disclosure, the photoelectric sensor is located on the side of the array substrate facing the counter substrate, which can be easily implemented in process.

Embodiment I and Embodiment II described above are illustrated by taking an example of arranging the photoelectric sensors in the display region. Hereinafter, a case that the photoelectric sensors are arranged in the peripheral region is introduced.

Figure 4C:
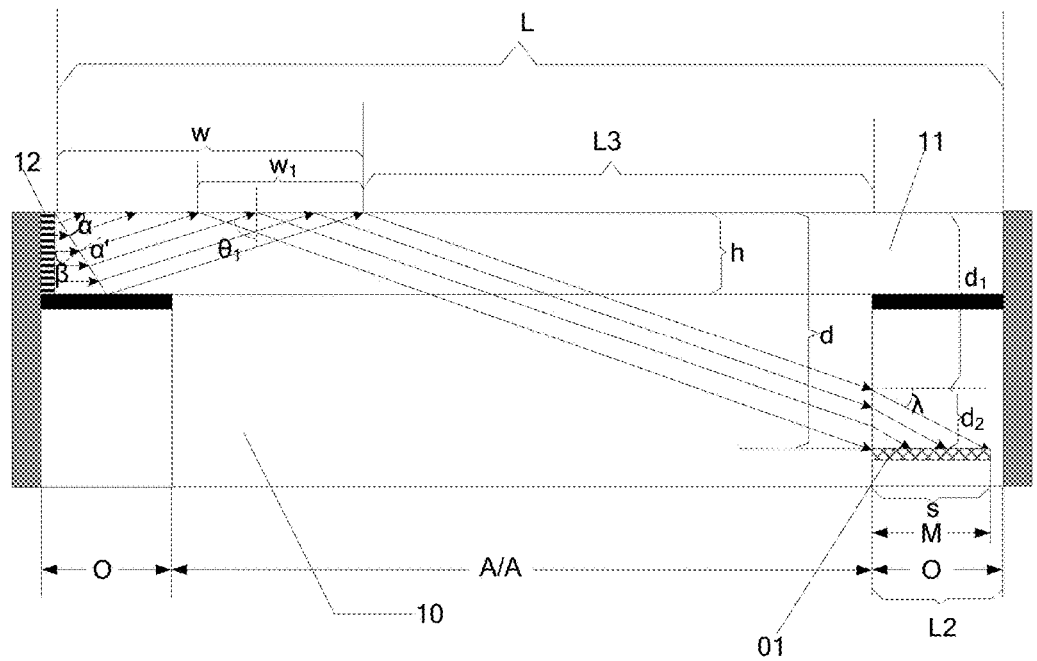
FIG. 4c is a position schematic diagram of an angle α and a touch region in a fingerprint identifying device provided by Embodiment III of the present disclosure.
Figure 4D:
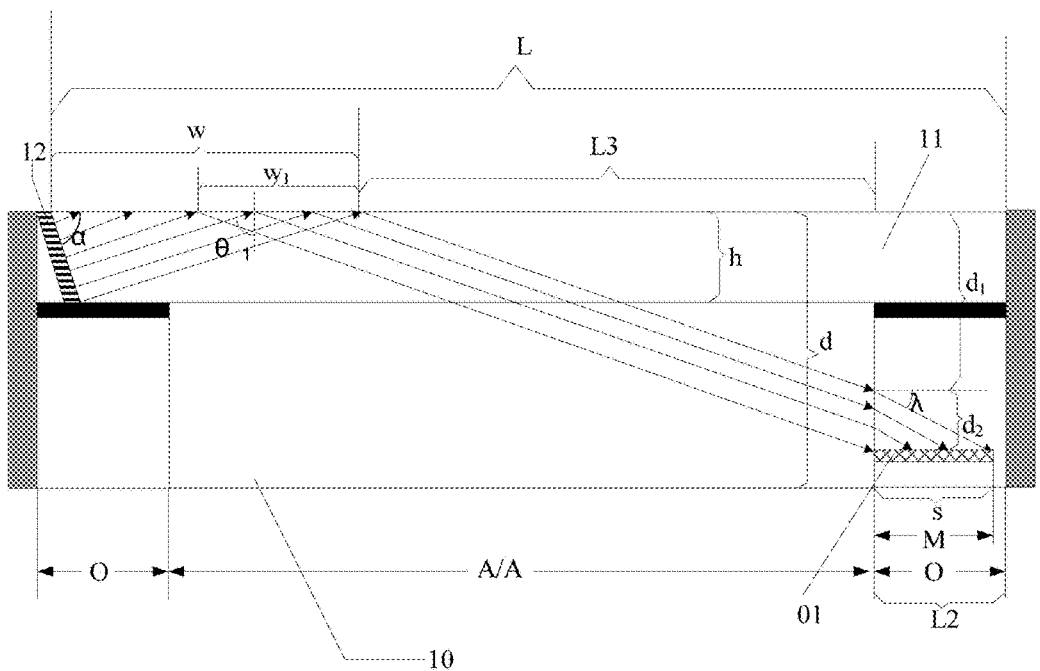
FIG. 4d is a position schematic diagram of an angle α and a touch region in a fingerprint identifying device provided by Embodiment IV of the present disclosure.

For example, in the fingerprint identifying device provided by the embodiment of the present disclosure, as shown in FIG. 4c and FIG. 4d, the display panel has a display region A/A and a peripheral region O; wherein, In a case where the photoelectric sensors 01 are located in the peripheral region O on a side opposite to an inclined surface, a range of an angle α between an inclined surface S1 and an upper surface S2 of the transparent cover plate 11 may be designed according to a refractive index of the transparent cover plate 11, an incident angle; a thickness of the transparent cover plate 11, thicknesses and reflective indexes of respective film layers between the photoelectric sensor 01 and the transparent cover plate 11, a width from a side of the inclined surface to an edge of the peripheral region O, on an opposite side, of the upper surface of the transparent cover plate 11, a width of the peripheral region O, a width of the detecting region, and a refractive index of a medium through which light reflected from the upper surface of the transparent cover plate 11 passes after entering into the peripheral region O.

Hereinafter, it is described by taking an example that refractive indexes of respective film layers between the transparent cover plate and the photoelectric sensor are the same as a refractive index of the transparent cover plate.

For example, in the fingerprint identifying device provided by the embodiment of the present disclosure, when the plurality of photoelectric sensors 01 are located in the peripheral region O, a range of the angle α is determined by a formula as follows:

$$0 < (d - L + h \cdot \tan\theta_1 + h/\tan\alpha - L2) \cdot \cot\theta_1 \cdot \cot[\arc\sin(\cos\theta_1/n_1)] < L2$$

Where, if $\beta = 90° - \alpha$, $\theta_1 = \arc\sin(\sin\beta \cdot n_0/n_1)$; and if $\beta = 0°$, $\theta_1 = \alpha$;

n1 denotes a refractive index of the transparent cover plate; h denotes a thickness of the transparent cover plate 11; d denotes a distance from a light receiving surface K of the photoelectric sensor to an upper surface S2 of the transparent cover plate; $L^2$ denotes a width of a peripheral region O; L denotes a width from a side of the inclined surface to an edge of the peripheral region, on an opposite side, of the upper surface S2 of the transparent cover plate 11; $n_0$ denotes a refractive index of a medium at a position of the detection light source 12 (i.e., a refractive index of a medium adjoining to the inclined surface on the side of the inclined surface); $\theta_1$ denotes an incident angle of light incident onto the upper surface after entering into the transparent cover plate, and $n^2$ denotes a refractive index of a medium through which light reflected from the upper surface of the transparent cover plate passes after entering into the peripheral region.

Hereinafter, the fingerprint identifying device provided by the embodiment of the present disclosure is described by two embodiments in detail.

Embodiment III

When the incident angle β is equal to 90°−α, as shown in FIG. 4c, the angle α between the inclined surface of the transparent cover plate 11 and the upper surface of the transparent cover plate 11, and a detecting region M where the plurality of photoelectric sensors 01 are located satisfies formulas as follows:

$$\beta = 90° - \alpha \tag{1}$$

$$\sin\beta \cdot n_0 = \sin\alpha' \cdot n_1 \tag{2}$$

$$\theta_1 = \alpha' + \alpha \tag{3}$$

$$w = h \cdot \tan\theta_1 + h/\tan\alpha \tag{4}$$

$$L3 = L - w - L2 \tag{9}$$

$$d_1 = \frac{L3}{\tan\theta_1} \tag{10}$$

$$d_2 = d - d_1 \tag{11}$$

$$n_2 \sin\lambda = n_1 \cdot \cos\theta_1 \tag{12}$$

$$s = \frac{d_2}{\tan\lambda} \tag{13}$$

Where, α' denotes a refractive angle after the parallel light is incident to the transparent cover plate 11, w denotes a width of an irradiating region on the upper surface thereof irradiated by the parallel light incident to the transparent cover plate 11, λ denotes a refractive angle of the parallel light incident to the peripheral region O after being reflected from the upper surface of the transparent cover plate 11, s denotes a width of a detecting region M in the peripheral region O, $d_1$ denotes a min distance from an interface of the display region A/A and the peripheral region O irradiated by the parallel light reflected from the upper surface of the transparent cover plate 11 to the upper surface of the transparent cover plate 11, $d_2$ denotes a max distance from an interface of the display region A/A and the peripheral region O irradiated by the parallel light reflected from the upper surface of the transparent cover plate 11 to the upper surface of the photoelectric sensor 01 (i.e., a light receiving surface of the photoelectric sensor 01).

It can be seen from FIG. 4c that, as long as a width s of the detecting region M in the peripheral region O satisfies 0<s<L2, it may be determined a value range of the angle α between the inclined surface of the transparent cover plate 11 and the upper surface of the transparent cover plate 11 when the detecting region M is located in the peripheral region O.

Embodiment IV

When the incident angle β is equal to 0°, as shown in FIG. 4d, the angle α between the inclined surface of the transparent cover plate 11 and the upper surface of the transparent cover plate 11 as well as a detecting region M where the plurality of photoelectric sensors 01 are located satisfies formulas as follows:

$$\theta_1 = \alpha \tag{6}$$

$$w = h \cdot \tan\theta_1 + h/\tan\alpha \tag{4}$$

$$L3 = L - w - L2 \tag{9}$$

$$d_1 = \frac{L3}{\tan\theta_1} \quad (10)$$

$$d_2 = d - d_1 \quad (11)$$

$$n_2 \sin\lambda = n_1 \cdot \cos\theta_1 \quad (12)$$

$$s = \frac{d_2}{\tan\lambda} \quad (13)$$

It can be seen from FIG. 4d that, as long as a width s of the detecting region M in the peripheral region O satisfies 0<s<L2, it may be determined a value range of the angle α between the inclined surface of the transparent cover plate 11 and the upper surface of the transparent cover plate 11 when the detecting region M is located in the peripheral region O.

Furthermore, in the fingerprint identifying device provided by the embodiment of the present disclosure, the angle α between the inclined surface of the transparent cover plate 11 and the upper surface of the transparent cover plate 11 is further determined according to a width of the detecting region M in the peripheral region O.

Further, in the fingerprint identifying device provided by the embodiment of the present disclosure, the angle α between the inclined surface of the transparent cover plate 11 and the upper surface of the transparent cover plate 11 is further determined according to a width $w_1$ of a touch region, where, $$w_1 = d \cdot \tan\theta_1 - (L - h \cdot \tan\theta_1 - h/\tan\alpha - L2)$$

Furthermore, in the fingerprint identifying device provided by the embodiment of the present disclosure, the angle α between the inclined surface of the transparent cover plate 11 and the upper surface of the transparent cover plate 11 is further determined according to a reflectivity β of light partially reflected at a position of the transparent cover plate in contact with a finger when the finger touches the transparent cover plate; where, $$\rho = \frac{1}{2}\left[\frac{\sin^2(\theta_1 - \theta_2)}{\sin^2(\theta_1 + \theta_2)} + \frac{\tan^2(\theta_1 - \theta_2)}{\tan^2(\theta_1 + \theta_2)}\right]$$

$$\theta_2 = \arcsin(n_1 \cdot \sin\theta_1 / n')$$

n' denotes a refractive index of a skin of a human fingerprint part; and $\theta_2$ denotes a refracted angle of light refracted at a position of the transparent cover plate in contact with a finger when the finger touches the transparent cover plate.

Hereinafter, it takes a mobile phone with a 5-inch display region of a screen as an example. A thickness h of the transparent cover plate is 0.55 mm, a distance d from the photoelectric sensor to an upper surface of the transparent cover plate is 0.953 mm, and a width from a side of the inclined surface to an edge of the peripheral region O, on an opposite side, of the upper surface of the transparent cover plate is L=110+15+15=140 mm; and in Embodiment III, the medium at the position of the detection light source 12 is air with a refractive index $n_0$ of 1. In Embodiments III and IV, the medium at the peripheral region O is air with a refractive index of 1. The widths $w_1$ of the finger touch regions, the reflectivities ρ of the partially reflected light and the widths s of the detecting regions M in the peripheral region O corresponding to different angles α can be obtained by the above formulas. For example, as shown in Table 3 and Table 4:

TABLE 3

| α | $w_1$ | s | ρ |
|---|---|---|---|
| 88.28° | 22.03 mm | 14.53 mm | 82.1% |
| 88.14° | 10.96 mm | 7.23 mm | 80.8% |

TABLE 4

| α | $w_1$ | s | ρ |
|---|---|---|---|
| 89.41° | 20.96 mm | 13.82 mm | 82% |
| 89.37° | 11.69 mm | 7.7 mm | 80.9% |

Where, Table 3 shows the widths $w_1$ of the finger touch regions, the reflectivities ρ of the partially reflected light and the widths s of the detecting regions M in the peripheral region O corresponding to different angles α, in a case of β=90°−α; and Table 4 shows the width $w_1$ of the finger touch region, the reflectivity ρ of the partially reflected light and the width s of the detecting region M in the peripheral region O corresponding to different angles α, in a case of β=0°.

It can be seen from Table 3 and Table 4 that, when a value of the angle α is larger, the width $w_1$ of the finger touch region and the width s of the detecting region M in the peripheral region O are also larger, and the reflectivity ρ of the partially reflected light is also large. A too large reflectivity ρ may result in a slight difference between light reflected from the peak and light reflected from the trough of the fingerprint, resulting in reducing an accuracy rate of identifying a fingerprint. When the value of the angle α is smaller, the reflectivity ρ of the partially reflected light is also smaller, which is conducive to improving the accuracy rate of identifying the fingerprint. However, the width $w_1$ of the finger touch region and the width s of the detecting region M in the peripheral region O are also smaller. Therefore, in the fingerprint identifying device provided by the embodiment of the present disclosure, a size of the finger touch region can be adjusted according to the angle α, and meanwhile, in reverse, a suitable angle α may be designed according to a size of the finger touch region actually required, a width of the detecting region M and an accuracy rate of identifying a fingerprint required.

Furthermore, the fingerprint identifying device provided by the embodiment of the present disclosure, as shown in FIG. 2a to FIG. 2d, further includes a light-blocking layer 13 located in the peripheral region O and arranged between the display panel (i.e., the substrate 10) and the transparent cover plate 11. For example, the light-blocking layer can include ink, which is not limited here.

It can be seen from Embodiments III and IV that, when the detecting region is arranged in the peripheral region, the light-blocking layer can prevent the detecting region from being affected by ambient light, but a width of the finger touch region and a width of the detecting region are relatively small.

For example, in the fingerprint identifying device provided by the embodiment of the present disclosure, when light reflected from the upper surface of the transparent cover plate is needed to pass the light-blocking layer, the light blocking layer is provided with a plurality of via holes, so that light reflected from the upper surface of the transparent cover plate passes the via holes in the light-blocking layer to irradiate on the photoelectric sensor.

Furthermore, the fingerprint identifying device provided by the embodiment of the present disclosure, as shown in FIG. 2a to FIG. 2d, further includes an outer frame 14 surrounding the display panel (i.e., the substrate 10), the transparent cover plate 11, and the detection light source 12, which is not limited here.

Furthermore, for example, a sticking layer is further arranged between the transparent cover plate and the display panel, so that the transparent cover plate and the display panel are mutually fixed by the sticking layer, which is not limited here.

Based on a same inventive conception, an embodiment of the present disclosure further provides a fingerprint identifying system including any fingerprint identifying device provided by the embodiments of the present disclosure. A working principle of the fingerprint identifying system is similar to that of the fingerprint identifying device, so that the implementations of the fingerprint identifying device may be referred to for implementations of the fingerprint identifying system, and repeated description is not given here.

In the fingerprint identifying device and the fingerprint identifying system provided by the embodiments of the present disclosure, a side surface of the transparent cover plate is set to be inclined with respect to an upper surface thereof, so that an angel between the side surface and the upper surface is an acute angle; and a detection light source is arranged on the side of the inclined surface of the transparent cover plate. When the finger does not touch, because a refractive index of the transparent cover plate is greater than a refractive index of air, it is only necessary to ensure that an incident angle of light irradiating onto the upper surface of the transparent cover plate after passing through the inclined surface is greater than a critical angle of total reflection of light transmitting form the transparent cover plate to the air, and thus it can be ensured that light incident to the transparent cover plate from the inclined surface of the transparent cover plate is totally reflected on the upper surface of the transparent cover plate, the photoelectric sensor is arranged in a position capable of receiving light reflected from the upper surface of the transparent cover plate, so that an intensity of light can be detected by the photoelectric sensor; and when the finger touches, the trough of the fingerprint part is not in contact with the transparent cover plate, so that light at a position of the trough may be totally reflected to only generate a reflected light, and light energy is totally reflected back, while the peak of the fingerprint part is in contact with the transparent cover plate, since a refractive index of the transparent cover plate is less than a refractive index of a human body, part of light at a position of the peak is refracted to form a refracted light entering into air, and part of light is reflected to form a reflected light irradiating on the photoelectric sensor, resulting in great intensity difference between light reflected from the positions of the trough and light reflected from the position of the peak, thereby improving the accuracy rate of the fingerprint identifying device.

Although the embodiments of the present disclosure have been described above in great detail with general descriptions and specific embodiments, on the basis of the embodiments of the present disclosure, various changes and improvements may be made, which is apparent to those skilled in the art. Therefore, all such changes and improvements without departing from the spirit of the present disclosure are within the scope of the claims of the present disclosure.

The application claims priority of Chinese Patent Application No. 201510543546.6 filed on Aug. 28, 2015, the disclosure of which is incorporated herein by reference in its entirety as part of the present application.

The invention claimed is:

1. A fingerprint identifying device, comprising:
   a substrate;
   a transparent cover plate, located right above the substrate;
   a detection light source, located on a first side of the transparent cover plate; and
   a photoelectric sensor, located on a side of a lower surface of the transparent cover plate, wherein,
   a refractive index of the transparent cover plate is less than a refractive index of a skin of a human fingerprint part, the transparent cover plate has a side surface on the first side, and an angle $\alpha$ between the side surface and an upper surface of the transparent cover plate is an acute angle,
   the detection light source is configured to provide a light beam towards the side surface of the transparent cover plate, so that the light beam is incident to the upper surface of the transparent cover plate through the side surface of the transparent cover plate, and the light beam is totally reflected on the upper surface of the transparent cover plate in a case that the upper surface of the transparent cover plate is in contact with air,
   the photoelectric sensor is configured to receive a light beam reflected from the upper surface of the transparent cover plate.

2. The fingerprint identifying device according to claim 1, wherein, the light beam provided by the detection light source is a parallel light beam, and an incident angle $\beta$ of the parallel light beam on the side surface of the transparent cover plate satisfies equations as follows: $\beta=90°-\alpha$, or $\beta=0°$.

3. The fingerprint identifying device according to claim 2, wherein, the substrate is a display panel, and the display panel has a display region and a peripheral region; wherein,
   the photoelectric sensor is located in the display region, and the angle $\alpha$ is determined by a formula as follows:

$$h\cdot\tan\theta_1 + h/\tan\alpha + d\cdot\tan\theta_1 < L1$$

where, if $\beta=90°-\alpha$, $\theta_1=\arcsin(\sin\beta\cdot n_0/n_1)$; and if $\beta=0°$, $\theta_1=\alpha$;
   n1 denotes a refractive index of the transparent cover plate, h denotes a thickness of the transparent cover plate, d denotes a distance from a light receiving surface of the photoelectric sensor to the upper surface of the transparent cover plate, L1 denotes a width from an edge of the upper surface of the transparent cover plate on the first side to a vertical projection of an interface between the display region and the peripheral region on a side opposite to the first side on the upper surface of the transparent cover plate, $n_0$ denotes a refractive index of a medium adjoining to the side surface on the first side of the transparent cover plate, and $\theta_1$ denotes an incident angle of the light beam on the upper surface after entering into the transparent cover plate.

4. The fingerprint identifying device according to claim 3, wherein, the angle $\alpha$ is further determined by a width $w_1$ of a touch region; wherein, $w_1 = h\cdot\tan\theta_1 + h/\tan\alpha$.

5. The fingerprint identifying device according to claim 4, wherein, the display panel has an array substrate and a counter substrate which are arranged opposite to each other in the display region; wherein, the counter substrate is located between the transparent cover plate and the array substrate;
- the photoelectric sensor is located on a side of the array substrate facing the counter substrate; or
- the photoelectric sensor is located on a side of the counter substrate facing the array substrate; or
- the photoelectric sensor is located between the transparent cover plate and the counter substrate.

6. The fingerprint identifying device according to claim 3, wherein, the display panel has an array substrate and a counter substrate which are arranged opposite to each other in the display region; wherein, the counter substrate is located between the transparent cover plate and the array substrate;
- the photoelectric sensor is located on a side of the array substrate facing the counter substrate; or
- the photoelectric sensor is located on a side of the counter substrate facing the array substrate; or
- the photoelectric sensor is located between the transparent cover plate and the counter substrate.

7. The fingerprint identifying device according to claim 1, wherein, the transparent cover plate is a glass cover plate.

8. The fingerprint identifying device according to claim 7, wherein, the substrate is a display panel, and the display panel has a display region and a peripheral region; wherein,
the plurality of photoelectric sensors are located in the peripheral region on a side opposite to the first side, and the angle α is determined by a formula as follows:

$$0 < (d - L + h \cdot \tan\theta_1 + h/\tan\alpha - L2) \cdot \cot\theta_1 \cdot \cot[\arc\sin(\cos\theta_1 \cdot n_1/n_2)] < L2$$

where, if $\beta = 90° - \alpha$, $\theta_1 = \arc\sin(\sin\beta \cdot n_0/n_1)$; and if $\beta = 0°$, $\theta_1 = \alpha$;
n1 denotes a refractive index of the transparent cover plate, h denotes a thickness of the transparent cover plate, d denotes a distance from a light receiving surface of the photoelectric sensor to the upper surface of the transparent cover plate, L2 denotes a width of a peripheral region O, L denotes a width from an edge of the upper surface of the transparent cover plate on the first side to a vertical projection of an outer edge of the peripheral region on a side opposite to the first side on the upper surface of the transparent cover plate, $n_0$ denotes a refractive index of a medium adjoining to the side surface on the first side of the transparent cover plate, $\theta_1$ denotes an incident angle of the light beam on the upper surface after entering into the transparent cover plate, and n2 denotes a refractive index of a medium through which the light beam reflected from the upper surface of the transparent cover plate passes after entering into the peripheral region.

9. The fingerprint identifying device according to claim 8, wherein, the angle α is further determined by a width $w_1$ of a touch region; where, $w_1 = d \cdot \tan\theta_1 - (L - h \cdot \tan\theta_1 - h/\tan\alpha - L2)$.

10. The fingerprint identifying device according to claim 8, wherein, the fingerprint identifying device further comprises a light-blocking layer located in the peripheral region and arranged between the display panel and the transparent cover plate.

11. The fingerprint identifying device according to claim 10, wherein, the light blocking layer is provided with a plurality of via holes, the light beam reflected from the upper surface of the transparent cover plate irradiates on a light receiving surface of the photoelectric sensor through the via holes.

12. The fingerprint identifying device according to claim 7, wherein, the substrate is a display panel, and the display panel has a display region and a peripheral region; wherein,
the photoelectric sensor is located in the display region, and the angle α is determined by a formula as follows:

$$h \cdot \tan\theta_1 + h/\tan\alpha + d \cdot \tan\theta_1 < L1$$

where, if $\beta = 90° - \alpha$, $\theta_1 = \arc\sin(\sin\beta \cdot n_0/n_1)$; and if $\beta = 0°$, $\theta_1 = \alpha$;
n1 denotes a refractive index of the transparent cover plate, h denotes a thickness of the transparent cover plate, d denotes a distance from a light receiving surface of the photoelectric sensor to the upper surface of the transparent cover plate, L1 denotes a width from an edge of the upper surface of the transparent cover plate on the first side to a vertical projection of an interface between the display region and the peripheral region on a side opposite to the first side on the upper surface of the transparent cover plate, $n_0$ denotes a refractive index of a medium adjoining to the side surface on the first side of the transparent cover plate, and $\theta_1$ denotes an incident angle of the light beam on the upper surface after entering into the transparent cover plate.

13. The fingerprint identifying device according to claim 12, wherein, the angle α is further determined by a width $w_1$ of a touch region; wherein, $w_1 = h \cdot \tan\theta_1 + h/\tan\alpha$.

14. The fingerprint identifying device according to claim 13, wherein, the display panel has an array substrate and a counter substrate which are arranged opposite to each other in the display region; wherein, the counter substrate is located between the transparent cover plate and the array substrate;
- the photoelectric sensor is located on a side of the array substrate facing the counter substrate; or
- the photoelectric sensor is located on a side of the counter substrate facing the array substrate; or
- the photoelectric sensor is located between the transparent cover plate and the counter substrate.

15. The fingerprint identifying device according to claim 12, wherein, the display panel has an array substrate and a counter substrate which are arranged opposite to each other in the display region; wherein, the counter substrate is located between the transparent cover plate and the array substrate;
- the photoelectric sensor is located on a side of the array substrate facing the counter substrate; or
- the photoelectric sensor is located on a side of the counter substrate facing the array substrate; or
- the photoelectric sensor is located between the transparent cover plate and the counter substrate.

16. The fingerprint identifying device according to claim 1, wherein, the substrate is a display panel, and the display panel has a display region and a peripheral region; wherein,
the photoelectric sensor is located in the display region, and the angle α is determined by a formula as follows:

$$h \cdot \tan\theta_1 + h/\tan\alpha + d \cdot \tan\theta_1 < L1$$

where, if $\beta = 90° - \alpha$, $\theta_1 = \arc\sin(\sin\beta \cdot n_0/n_1)$; and if $\beta = 0°$, $\theta_1 = \alpha$;
$n_1$ denotes a refractive index of the transparent cover plate, h denotes a thickness of the transparent cover plate, d denotes a distance from a light receiving surface of the photoelectric sensor to the upper surface of the transparent cover plate, L1 denotes a width from an edge of the upper surface of the transparent cover plate on the first side to a vertical projection of an interface between the display region and the peripheral region on a side opposite to the first side on the upper surface of the transparent cover plate, $n_0$ denotes a refractive index of a medium adjoining to the side surface on the first side of the transparent cover plate, and $\theta_1$ denotes an incident angle of the light beam on the upper surface after entering into the transparent cover plate.

17. The fingerprint identifying device according to claim 16, wherein, the angle $\alpha$ is further determined by a width $w_1$ of a touch region; wherein, $w_1 = h \cdot \tan\theta_1 + h/\tan\alpha$.

18. The fingerprint identifying device according to claim 16, wherein, the display panel has an array substrate and a counter substrate which are arranged opposite to each other in the display region; wherein, the counter substrate is located between the transparent cover plate and the array substrate;

the photoelectric sensor is located on a side of the array substrate facing the counter substrate; or the photoelectric sensor is located on a side of the counter substrate facing the array substrate; or the photoelectric sensor is located between the transparent cover plate and the counter substrate.

19. The fingerprint identifying device according to claim 16, wherein, the angle $\alpha$ is further determined by a reflectivity $\rho$ of the reflected light beam which is partially reflected at a position of the transparent cover plate in contact with a finger when the finger touches the transparent cover plate; where, $$\rho = \frac{1}{2}\left[\frac{\sin^2(\theta_1 - \theta_2)}{\sin^2(\theta_1 + \theta_2)} + \frac{\tan^2(\theta_1 - \theta_2)}{\tan^2(\theta_1 + \theta_2)}\right]$$

$$\theta_2 = \arcsin(n_1 \cdot \sin\theta_1 / n')$$

n' denotes a refractive index of a skin of a human fingerprint part, and $\theta_2$ denotes a refracted angle of the refracted light beam at a position of the transparent cover plate in contact with a finger when the finger touches the transparent cover plate.

20. A fingerprint identifying system, comprising a fingerprint identifying device according to claim 1.

* * * * *